3,038,879
Patented June 12, 1962

3,038,879
BLOCK COPOLYCARBONATES FROM TETRA-CHLOROBISPHENOL A AND 4,4'-BIS(HYDROXY-PHENYL)-NAPHTHYL METHANES
Thomas M. Laakso and David A. Buckley, Rochester, N.Y., assignors to Eastman Kodak Company, Rochester, N.Y., a corporation of New Jersey
No Drawing. Filed July 17, 1959, Ser. No. 827,707
2 Claims. (Cl. 260—47)

This invention relates to an improved polycarbonate of tetrachlorobisphenol A which is essentially composed of alternating blocks having structures composed of (I) recurring units from tetrachlorobisphenol A and (II) recurring units from 4,4'-bis (hydroxyphenyl)-naphthylmethanes wherein from about 40 to 85 mole percent of the recurring units are derived from tetrachlorobisphenol A. The naphthyl radicals can also be halogenated. This invention also relates to a process for preparing these block copolymers. These block polymers are characterized by having high heat softening temperatures, a high Young's modulus of elasticity and a high degree of flexibility. Useful photographic elements are also included in this invention wherein a film of the improved polycarbonate supports a coating of light-sensitive emulsion.

The preparation of polycarbonates of the general class with which this invention is concerned is well known in the art. A number of patents have been issued in the last few years describing polycarbonates prepared from bisphenol A and from tetrachlorobisphenol A. Among the prior art are various articles in the literature concerning this subject including an article by Schnell as to polycarbonates as a new group of plastics and the preparation and properties of aromatic polyesters of carbonic acid, Angewandte Chemie, 68: 633–660, No. 20, October 21, 1956.

An object of this invention is to provide an especially valuable improved polycarbonate predominantly derived from tetrachlorobisphenol A which has quite unusual properties which were unexpected in view of the prior art.

A further object of this invention is to provide a process for preparing such improved polycarbonates which are characterized by a block structure.

A further object of this invention is to provide photographic elements comprising a film support prepared from the improved polycarbonates provided by this invention and coated with a light-sensitive silver halide photographic emulsion.

Other objects will become apparent elsewhere herein.

According to a preferred embodiment of this invention there is provided an improved polycarbonate of tetrachlorobisphenol A consisting of a highly polymeric block copolymer having an inherent viscosity of from about 0.4 to about 3.5 essentially composed of alternating blocks having the structures:

I. Blocks composed of from about 3 to about 50 recurring units having the following Formula A:

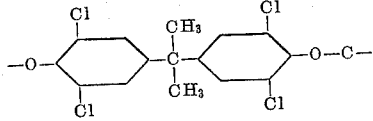

and

II. Blocks composed of about 3 to about 50 recurring units having the following Formula B:

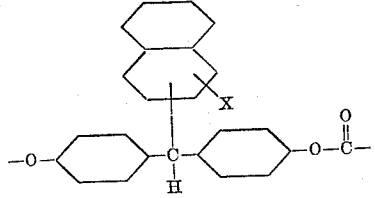

wherein the naphthyl radical is attached in a position selected from the 1 and 2 positions and X represents the substituent in the other one of the 1 and 2 positions and is selected from the group consisting of a chlorine atom, a fluorine atom and a hydrogen atom and wherein from about 40 to 85 mole percent of said block copolymer is composed of said units having Formula A, said block copolymer being characterized by having a heat distortion temperature in the range of from about 190°–250° C., having a Young's modulus of elasticity for film which is substantially as great as for the homopolymer of units of Formula A and at least about 30,000 kg./sq. cm. which is greater than for the homopolymer of units of Formula B, and having a flexibility measured by the MIT folds test at least about 2 times greater than for the homopolymer of units of Formula A and at least about 35.

Thus, this invention provides a highly useful series of high molecular weight block unit polymers having two different prepolymer blocks of units of a linear polycarbonate of a 4,4'-bis(hydroxyphenyl)naphthylmethanes (wherein the naphthyl may be halogenated) and a linear polycarbonate of 2,2-bis(3,5-dichloro-4-hydroxyphenyl)-propane (called tetrachlorobisphenol A). This series of block copolymers possesses to a surprisingly satisfactory degree the valuable properties of all of the blocks present in the polymer. This is considered an unobvious discovery for various reasons including the fact that neither of the individual high molecular weight homopolymers yield the results achieved in accordance with this invention. Moreover, the series of block copolymers encompassed by this invention have a most unexpectedly high Young's modulus of elasticity, a high degree of flexibility as measured by the MIT folds test and high heat distortion temperatures, all of which are important characteristics of any film to be used as a support for a photographic element.

The article mentioned above written by Schnell explains that the broad concept of such polycarbonates as are contemplated by this invention was known prior to the discoveries disclosed herein. Work in various places based upon the activities of workers in this art during the past half century has recently resulted in a preparation of commercial polycarbonate films derived from bisphenol A which is more specifically known as 2,2-bis(4-hydroxyphenol)propane. It appears that such bisphenol A polycarbonates are not only being commercially used for many of the purposes for which films in general are useful but that they are also being contemplated for certain rather severely limited utility as a photographic film support. Thus, the use of polycarbonates from bisphenol A as a photographic base is very seriously limited by the fact that the Young's modulus of elasticity is only somewhere on the order of about 23,000 kg./sq. cm. This compares quite unfavorably with other commercially available film bases such as cellulose triacetate where the Young's modulus lies in the range of 30,000–40,000. Another film base useful for photographic purposes is oriented polystyrene which has a Young's modulus somewhere on the order of about 35,000 kg./sq. cm.

It is obvious that for a photographic film base to be a significant improvement over the prior art it should have some properties which render it substantially superior to cellulose triacetate which is generally recognized as the most commonly used satisfactory film base for photographic purposes. The tremendous number of characteristics and properties of photographic film bases is well known in the art relating to photography. The work in recent years in this art has tended toward the development of new base materials such as the general class of polyesters including polycarbonates, polyvinyl derivatives such as polystyrene, etc. A polyester such as polyethylene terephthalate is useful as a film base but cannot be solvent cast by the practicable techniques so carefully and thoroughly developed during the last few decades with regard to cellulose esters as film bases. Although poly-vinyl derivatives such as polystyrene can be solvent cast, a film base prepared from polystyrene (even though it has been oriented) has a heat softening temperature on the order of only about 100° C. and therefore has rather limited utility. In contrast, a film base derived from cellulose triacetate has a heat softening temperature on the order of about 155° C.

The photographic film bases which can be solvent cast and which have been described in the prior art as of commercial value such as cellulose triacetate and polystyrene are considered to have flexibilities which are merely on the edge of being satisfactorily acceptable. Thus, cellulose triacetate has a flexibility as measured by the MIT folds test of about 25–35 folds. Polystyrene is somewhat better and has an average flexibility of about 50.

With the development of polycarbonate films such as can be derived from bisphenol A it became obvious that they had promise with regard to their use as photographic film bases provided that the Young's modulus of elasticity could be improved upon. One polycarbonate mentioned by Schnell and by others which appeared to have some promise was that derived from tetrachlorobisphenol A since this polycarbonate as a film has a Young's modulus of elasticity of about 30,000 kg./sq. cm. This value is substantially the same as the lowest values ordinarily measured for cellulose triacetate film bases. However, the flexibility of well cured films of a homopolymer of tetrachlorobisphenol A was found to be extremely low and quite unsatisfactory for commercial applications as a photographic film base.

One possibility which was considered by the inventors was the preparation of random copolymers of tetrachlorobisphenol A and bisphenol A with a view toward obtaining a copolymer which might have improved flexibility and a reasonably high heat softening temperature along with all of the other properties necessary for satisfactory utility as a photographic film support. However, it was found that such modifications of the polycarbonate from tetrachlorobisphenol A resulted in further reductions in the flexibility of films prepared therefrom. Moreover, the heat softening temperature was significantly reduced. Further work was also performed involving mixtures of homopolymers from bisphenol A. In doing this it was found that the Young's modulus was significantly reduced although in some cases it still retained satisfactory value for marginal utility of limited use for certain photographic film purposes.

It was, therefore, quite surprising when it was found that block copolymers prepared in accordance with the invention described herein had a Young's modulus substantially as great as for the homopolymer derived from tetrachlorobisphenol A and at least about 30,000 kg./sq. cm. It was even more surprising to find that these block copolymers had flexibility values measured by the MIT folds test of at least about 2 times greater than for the homopolymer of tetrachlorobisphenol A and at least about 35, which is substantially as good as or a little better than cellulose triacetate film bases. Other tests disclosed that the polycarbonates contemplated by this invention had exceptionally high heat distortion or softening temperatures which was most unexpected and other properties and characteristics which rendered them quite useful as photographic film supports. Such other properties have been adequately described in the prior art with regard to polycarbonates of this general type.

Perhaps the most outstanding property of the polycarbonate film bases is the retention of the Young's modulus of elasticity at much higher temperatures than in the case of film from cellulose triacetate, polystyrene in oriented form and polyethylene terephthalate in oriented form.

Thus, the polycarbonate films produced in accordance with the present invention retain to a substantial degree their high modulus of elasticity at temperatures up to their heat softening temperatures, namely 180°–240° C. In contrast, the retention of Young's modulus for polyethylene terephthalate begins to fall off very rapidly at temperatures of about 100° C. and becomes significantly less than the Young's modulus for the polycarbonates of this invention at temperatures approaching 200° C. This factor also applies to film supports prepared from cellulose esters and polystyrene although the drop-off is not as pronounced as it is for polyethylene terephthalate. As a result, the polyesters of this invention have unusually valuable properties as photographic film supports at temperatures above 150° C.

Thus, according to this invention it has been found that by preparing block copolymers consisting of alternating sequences of polycarbonates derived from tetrachlorobisphenol A (particularly 75 mole percent tetrachlorobisphenol A and 25 mole percent of the modifying bisphenol), there is obtained a significant improvement in the substandard properties without sacrificing to any unacceptable degree the desirable values shown by the homopolymers. These block copolymers show physical properties quite different from the random copolymers prepared by conventional methods. That these block copolymers are not physical mixtures is shown by their different solubility characteristics in organic solvents.

This invention can be further illustrated by the following examples of preferred embodiments although it will be understood that these examples are included merely for purposes of illustration and are not intended to limit the scope of the invention unless otherwise specifically indicated.

PREFERRED EXAMPLES

Preparation of block copolycarbonate of 75 mole percent tetrachlorobisphenol A—25 mole percent 4,4'-bis(hydroxyphenyl) naphthylmethane.

Simultaneous preparation of the two homopolymer blocks was employed (see table of components below). In two separate three-necked flasks equipped with a stirrer, a thermometer and a dropping-funnel were placed distilled water, sodium hydroxide and the bisphenol component. A clear solution was obtained and the flask was maintained at about 15° C. or lower by means of an ice bath, then part of the distilled methylene chloride was added with stirring and phosgene dissolved in cold, dry, distilled methylene chloride was added slowly within a period of 15 to 45 minutes, keeping the temperature below about 15° C. The contents in the two flasks were reacted for about the same periods of time so as to obtain low molecular weight polymers of I.V. about 0.1 to 0.2. The contents of the flasks were then combined at once and the catalyst added. The components were as follows.

Component A:
    54.9 g. (0.15 mole) tetrachlorobisphenol A
    16.8 g. (0.42 mole) sodium hydroxide
    16.3 g. (0.165 mole) phosgene in 50 ml. cold, dry, distilled methylene chloride
    400 ml. distilled water
    240 ml. distilled methylene chloride Component B:
    16.3 g. (0.05 mole) 4,4'-bis(hydroxyphenyl)napthyl methane
    5.6 g. (0.14 mole) sodium hydroxide
    5.4 g. (0.055 mole) phosgene in 50 ml. cold, dry, distilled methylene chloride
    120 ml. distilled water
    100 ml. distilled methylene chloride Component C: 10 drops tri-n-butylamine The above components (A) and (B) were run separately and simultaneously, combined, the tri-n-butyl amine added, and allowed to polymerize. After the polymerization had reached a satisfactory viscosity, the reaction mixture was acidified with glacial acetic acid, washed free of water-soluble materials and the polymer precipitated from solution by pouring the viscous dope into several volumes of methyl alcohol.

The yield of white fibrous copolycarbonate was 91 percent of the theoretical value and it had an inherent viscosity of 1.1 in chloroform.

A clear film cast from a methylene chloride solution of this block copolycarbonate had the following physical properties:

| | |
|---|---|
| Young's modulus | kg./cm.² — 3.2×10⁴ |
| Yield and tensile | kg./cm.² — 840 |
| Elongation | percent — 5 |
| Tear | 40 |
| Folds | 35 |
| Heat distortion temperature | °C. — 242 |

Various runs were prepared as just described using other proportions of reactants and other reactants as covered by the above general Formula B. At the end of the separate runs the I.V. was usually about 0.1–0.2 although values of 0.05–0.25 are also contemplated. At the beginning of the combined polymerization reactions the polymer solutions had flow times of just a few seconds as measured from a standard pipette. After a few minutes of continuous stirring, the flow time of the combined reaction mixture had increased from 50 up to several hundred seconds depending upon the time mixed and the desired I.V. being sought. The polymerization was stopped at this time by acidifying the reaction with glacial acetic acid. The methylene chloride layer was diluted with enough methylene chloride to allow more efficient stirring and water washing of the polymer solution free of soluble materials. The polymer was usually precipitated from methylene chloride solution by slowly pouring the viscous dope into methyl alcohol. After leaching in fresh methanol, the polymer was generally dried at 50° C. under reduced pressure.

The yield of white fibrous polymer was usually at least 80% of the theoretical value. These block copolymers had and inherent viscosity of from about 0.4 to 3.5 as measured in chloroform. The I.V. can also be measured in other solvents such as in 1:1 phenol and chlorobenzene solution.

Physical properties of the block copolymers were in the ranges described above. See also the table below.

The unmodified tetrachlorobisphenol A (TC BPA) polymer can be prepared by a preferred procedure as follows:

A solution of 38 g. (0.95 mole) sodium hydroxide and 5 g. (0.022 mole) benzyltriethylammonium chloride was prepared in 300 ml. of distilled water. With continuous and efficient stirring 122 g. (0.30 mole) of 2,2-bis(3,5-dichloro-4-hydroxyphenyl)propane was added together with 500 ml. of distilled methylene chloride. The temperature of the reaction mixture was kept at 20° C. while 35 g. (0.35 mole) phosgene in 200 ml. of dry distilled methylene chloride was added in 55 minutes. At the end of this time one ml. of triethylamine was added. The cooling water was removed, and stirring was continued for 45 minutes. During this time the viscosity of the methylene chloride layer had increased noticeably (10 sec. as determined with a standard pipette). A slight excess of glacial acetic acid was added to neutralize all the alkali and the methylene chloride layer was washed free of acid with water. The wet polymer solution was then precipitated out of solution by slowly running it into 3 volumes of methyl alcohol. The polymer was leached in fresh methanol to remove residual methylene chloride.

The yield of pure, white, fibrous polycarbonate was 102.5 g. or 91 percent of the theoretical value. The inherent viscosity as determined in phenol-chlorobenzene (50:50) was 0.52.

*Physical Data on Tetrachlorobisphenol A Polycarbonate Plate Coatings (Coated From 3:1 Dope in Methylene Chloride)*

| | |
|---|---|
| Young's modulus | 3.00×10⁴ kg./cm.². |
| Yield stress | 750 kg./cm.². |
| Tensile strength | 800. |
| Elongation | 5 percent. |
| Res. tear | 95. |
| I.V. of the polymer | 0.52. |
| M.P. | 302° C. |
| Swell and shrink | 0.06 percent (125° F.). |
| Heat distortion temperature | over 205° C. (between 220 and 240° C.). |

For comparative purposes the following describes the preparation of random-type copolycarbonate 70 mole percent tetrachlorobisphenol A and 30 mole percent bisphenol A:

In a 3-l., three-necked flask equipped with a stirrer, a thermometer and a dropping-funnel were placed 76.86 g. (0.21 mole) tetrachlorobisphenol A and 20.52 g. (0.09 mole) bisphenol A, together with 33.6 g. (0.84 mole) sodium hydroxide and 800 ml. distilled water. When a clear solution was obtained, the flask was cooled by means of running water to 18° C. and 400 ml. of distilled methylene chloride was added, followed by 2 ml. of tri-n-butylamine and 2 g. benzyltriethyl ammonium chloride. With efficient stirring 33 g. (0.33 m.) phosgene dissolved in 80 ml. of distilled dry, cold methylene chloride was added slowly within a period of 25 minutes, keeping the temperature at 10–13° C. At the beginning of the polymerization reaction the solution had a flow time of 2.3 seconds as measured with a standard pipette. After 45 minutes of continuous stirring the flow time was 45 seconds. The polymerization was stopped by acidifying the reaction with glacial acetic acid. The methylene chloride layer was diluted with enough methylene chloride to allow more efficient stirring and water washing of the polymer solution free of soluble materials. The polymer was then precipitated from methylene chloride solution by slowly pouring the viscous solution into methyl alcohol. After leaching in fresh methanol, the polymer was dried at 50° under reduced pressure.

The yield of white fibrous copolymer was 85% of the theoretical value. It had an inherent viscosity of about 0.7 as measured in 1:1 phenol chlorobenzene solution.

Physical properties of above random-type copolymer

| | |
|---|---|
| Young's modulus | kg./cm.² — 2.85×10⁴ |
| Yield and tensile | kg./cm.² — 825 |
| Elongation | percent — 5 |

Other properties are given in the table hereinbelow as to this random copolycarbonate and others similarly prepared as shown.

Related polycarbonates can be similarly prepared for comparative purposes as to those data shown in the table below as follows:

EXAMPLE A.—HOMOPOLYCARBONATE FROM 4,4'-BIS-(HYDROXYPHENYL)PHENYL METHANE

Thirteen and eight-tenths grams (0.05 ml.) of 4,4'-bis-(hydroxyphenyl)-phenyl methane is dissolved in 5.6 g. (0.14 mole) sodium hydroxide in 120 ml. of distilled water. This solution is cooled to 10° C. and 100 ml. of distilled water. This solution is cooled to 10° C. and 100 ml. of distilled methylene chloride is added. With good stirring, a solution of 5.4 g. (0.055 mole) phosgene in 50 ml. of cold, dry, distilled methylene chloride is added within a period of 15 minutes at such a rate that the temperature does not exceed 12° C. After the phosgene is added, 3 drops of tri-n-butylamine is added. Stirring is continued to a point where the viscosity of the lower methylene chloride layer had increased to the consistency of a thick dough. The reaction is made acid with glacial acetic acid. Four hundred ml. of chloroform is added to dissolve the dough and the resulting solution is washed free of all soluble materials with running cold water so that a drop of the solution gives a clear film when coated on a glass plate. The polymer is isolated by pouring the viscous dope into several volumes of methyl alcohol.

The yield of white fibrous polycarbonate is about 93% of the theoretical value and it had an inherent viscosity of 1.81 in chloroform.

A clear film cast from a methylene chloride solution of this polymer had the following physical properties.

Young's modulus _____ kg./cm.$^2$__ 2.63×10$^4$
Yield and tensile _____ kg./cm.$^2$__ 665
Elongation _____ percent__ 7
Tear _____ 48
Folds _____ 174
Heat distortion temperature _____ °C__ 216

All films tested were 0.005 inch thick unless otherwise stated.

EXAMPLE B.—POLYCARBONATE FROM 4,4'-BIS(HYDROXYPHENYL)-p-ISOPROPYLPHENYL METHANE

Using the procedure of Example A, the following materials were employed:

31.8 g. (0.1 mole) 4,4'-bis(hydroxyphenyl)-p-isopropylphenyl methane
11.2 g. (0.28 mole) sodium hydroxide
10.9 g. (0.11 mole) phosgene in 50 ml. dry, cold distilled methylene chloride
200 ml. distilled water
120 ml. distilled methylene chloride
1 ml. tri-n-butylamine Yield=95 percent. Viscosity determined in chloroform=1.16.

The film cast from methylene chloride solution had the following physical properties.

Young's modulus _____ kg./cm.$^2$__ 2.1×10$^4$
Yield and tensile _____ kg./cm.$^2$__ 680
Elongation _____ percent__ 4.8
Tear _____ 80
Folds _____ 23
Heat distortion temperature _____ °C__ 189

EXAMPLE C.—HOMOPOLYCARBONATE FROM 4,4'-BIS(HYDROXYPHENYL)-o-CHLOROPHENYL METHANE

Using the procedure of Example A, the following materials were employed to prepare the prepolymer:

31.05 g. (0.1 mole) 4,4'-bis(hydroxyphenyl)-o-chlorophenylmethane
11.2 g. (0.28 mole) sodium hydroxide
10.9 g. (0.11 mole) phosgene in 50 ml. cold, dry, distilled methylene chloride
200 ml. distilled water
120 ml. distilled methylene chloride
3 drops tri-n-butylamine Yield=85 percent. Viscosity determined in chloroform=1.17.

The film cast from methylene chloride solution had the following physical properties:

Young's Modulus _____ kg./cm.$^2$__ 2.9×10$^4$
Yield and tensile _____ kg./cm.$^2$__ 785
Elongation _____ percent__ 6
Folds _____ 65
Tear _____ 40
Heat distortion temperature _____ °C__ 225

EXAMPLE D.—HOMOPOLYCARBONATE FROM 4,4'-BIS(HYDROXYPHENYL)-2,4-DICHLOROPHENYL METHANE

Using the procedure of Example 1, the following materials were employed to prepare the polymer:

34.5 g. (0.1 mole) 4,4'-bis(hydroxyphenyl)-2,4-dichlorophenyl methane
11.2 g. (0.28 mole) sodium hydroxide
10.9 g. (0.11 mole) phosgene (in 50 ml. dry, cold, distilled methylene chloride
200 ml. distilled water
120 ml. distilled methylene chloride
10 drops tri-n-butylamine Yield=90 percent. Viscosity determined in chloroform=0.49.

The film cast from methylene chloride solution had the following physical properties:

Young's modulus _____ kg./cm.$^2$__ 2.81×10$^4$
Yield and tensile _____ kg./cm.$^2$__ 810
Elongation _____ percent__ 4.7
Tear _____ 44
Folds _____ 15
Heat distortion temperature _____ °C__ 187

EXAMPLE E.—HOMOPOLYCARBONATE FROM 4,4'-BIS(HYDROXYPHENYL)NAPHTHYL METHANE

Using the procedure of Example A, the following materials were employed to prepare the polymer:

32.6 g. (0.1 mole) 4,4'-bis(hydroxyphenyl)naphthyl methane
11.2 g. (0.28 mole) sodium hydroxide
10.9 g. (0.11 mole) phosgene in 50 ml. cold, dry, distilled methylene chloride
200 ml. distilled water
120 ml. distilled methylene chloride
10 drops tri-n-butylamine Yield=81 percent. Viscosity determined in chloroform=0.51.

The film cast from methylene chloride solution had the following physical properties:

Young's modulus _____ kg./m.$^2$__ 2.73×10$^4$
Yield and tensile _____ kg./m.$^2$__ 756
Elongation _____ percent__ 5.5
Tear _____ 120
Folds _____ 80
Heat distortion temperature _____ °C__ 215

EXAMPLE F.—BLOCK COPOLYCARBONATE FROM 4,4'-BIS(HYDROXYPHENYL)METHYL - 3,4 - DICHLOROPHENYL METHANE (75 MOLE PERCENT) AND 4,4'-BIS(HYDROXYPHENYL)NAPHTHYL METHANE (25 MOLE PERCENT)

Using the procedure of Example A, the following materials were employed to prepare the prepolymers.

Component A:
  52.85 g. (0.15 mole) 4,4'-bis(hydroxyphenyl)methyl-3,4-dichlorophenyl methane
  16.8 g. (0.42 mole) sodium hydroxide
  16.3 g. (0.16 mole) phosgene in 50 ml. cold, dry, distilled methylene chloride
  420 ml. distilled water
  200 ml. distilled methylene chloride Component B:
  16.3 g. (0.05 mole) 4,4'-bis(hydroxyphenyl)naphthyl methane
  5.6 g. (0.14 mole) sodium hydroxide
  5.4 g. (0.055 mole) phosgene in 50 ml. dry, cold, distilled methylene chloride
  120 ml. distilled water
  100 ml. distilled methylene chloride Component C: 1 ml. tri-n-butylamine The above components (A) and (B) were run separately and simultaneously combined, the tri-n-butylamine added and allowed to polymerize. After the polymerization had reached a satisfactory viscosity, the reaction mixture was acidified with glacial acetic acid, washed free of water-soluble materials, and the polymer precipitated from solution by pouring the viscous dope into several volumes of methyl alcohol.

The yield of white fibrous copolycarbonate was 97 percent of the theoretical value and it had an inherent viscosity of 0.77 in chloroform.

A clear film cast from a methylene chloride solution of this block copolycarbonate had the following physical properties:

| | | |
|---|---|---|
| Young's modulus | kg./cm.$^2$ | $3.2 \times 10^4$ |
| Yield and tensile | kg./m.$^2$ | 780 |
| Elongation | percent | 6 |
| Tear | | 40 |
| Folds | | 20 |
| Heat distortion temperature | °C | 223 |

EXAMPLE G.—BLOCK COPOLYCARBONATE FROM BISPHENOL A (40 MOLE PERCENT) 4,4'-BIS(HYDROXYPHENYL)NAPHTHYL METHANE (60 MOLE PERCENT)

Using the procedure of Example A, the following materials were employed to prepare the prepolymers.

Component A:
    11.4 g. (0.05 mole) bisphenol A
    5.6 g. (0.14 mole) sodium hydroxide
    5.4 g. (0.055 mole) phosgene in 50 ml. dry, cold, distilled methylene chloride
    120 ml. distilled water
    100 ml. distilled methylene chloride Component B:
    24.45 g. (0.075 mole) 4,4'-bis(hydroxyphenyl)-naphthyl methane
    8.4 g. (0.21 mole) sodium hydroxide
    8.2 g. (0.083 mole) phosgene in 50 ml. dry, cold, distilled methylene chloride
    200 ml. distilled water
    120 ml. distilled methylene chloride Component C: 1 ml. tri-n-butylamine The above components (A) and (B) were run separately and simultaneously, combined, the tri-n-butylamine added, and allowed to polymerize. After the polymerization had reached a satisfactory viscosity, the reaction mixture was acidified with glacial acetic acid, washed free of water-soluble materials, and the polymer precipitated from solution by pouring the viscous dope into several volumes of methyl alcohol.

The yield of white fibrous copolycarbonate was 97 percent of the theoretical value and it had an inherent viscosity of 0.42 in chloroform.

A clear film cast from a methylene chloride solution of this block copolycarbonate had the following physical properties:

| | | |
|---|---|---|
| Young's modulus | kg./cm.$^2$ | $2.73 \times 10^4$ |
| Yield and tensile | kg./cm.$^2$ | 827 |
| Elongation | percent | 6 |
| Tear | | 103 |
| Folds | | 52 |
| Heat distortion temperature | °C | 216 |

Film tested in this instance = 0.004 inch thick.

EXAMPLE H.—BLOCK COPOLYCARBONATE FROM BISPHENOL A (40 MOLE PERCENT) AND 4,4'-BIS(HYDROXYPHENYL)-o-CHLOROPHENYL METHANE (60 MOLE PERCENT)

Using the procedure of Example A, the following materials were employed to prepare the prepolymers.

Component A:
    11.4 g. (0.05 mole) bisphenol A
    5.6 g. (0.14 mole) sodium hydroxide
    5.4 g. (0.055 mole) phosgene in 50 ml. cold, dry, distilled methylene chloride
    120 ml. distilled water
    100 ml. distilled methylene chloride Component B:
    23.28 g. (0.075 mole) 4,4'-bis(hydroxyphenyl)-o-chlorophenyl methane
    8.4 g. (0.21 mole) sodium hydroxide
    8.2 g. (0.83 mole) phosgene in 50 ml. cold, dry, distilled methylene
    200 ml. distilled water
    120 ml. distilled methylene chloride Component C: ¼ ml. tri-n-butylamine The above components (A) and (B) were run separately and simultaneously, combined, the tri-n-butylamine added and allowed to polymerize. After the polymerization had reacted a satisfactory viscosity the reaction mixture was acidified with glacial acetic acid, washed free of water-soluble materials and the polymer precipitated from solution by pouring the viscous dope into several volumes of methyl alcohol.

The yield of white fibrous, copolycarbonate was 88.5 percent and it had an inherent viscosity of 0.57 in chloroform.

A clear film cast from a methylene chloride solution of this block copolycarbonate had the following physical properties:

| | | |
|---|---|---|
| Young's modulus | kg./cm.$^2$ | $2.65 \times 10^4$ |
| Yield and tensile | kg./cm.$^2$ | 700 |
| Elongation | percent | 5.5 |
| Tear | | 100 |
| Folds | | 56 |
| Heat distortion temperature | °C | 177 |

EXAMPLE I.—BLOCK COPOLYCARBONATE FROM BISPHENOL A (37 MOLE PERCENT) AND 4,4'-BIS(HYDROXYPHENYL)-2,4-DICHLOROPHENYL METHANE (63 MOLE PERCENT)

Using the procedure of Example A, the following materials were employed to prepare the prepolymers.

Component A:
    10 g. (0.04 mole) bisphenol A
    5.2 g. (0.13 mole) sodium hydroxide
    4.95 g. (0.05 mole) phosgene in 50 ml. dry, cold, distilled methylene chloride
    200 ml. distilled water
    120 ml. distilled methylene chloride Component B:
    25.9 g. (0.075 mole) 4,4'-bis(hydroxyphenyl)-2,4-dichlorophenyl methane
    8.4 g. (0.21 mole) sodium hydroxide
    8.2 g. (0.083 mole) phosgene in 50 ml. dry, cold, distilled methylene chloride
    200 ml. distilled water
    120 ml. distilled methylene chloride Component C: 1 ml. tri-n-butylamine The above components (A) and (B) were run separately and simultaneously, combined, the tri-n-butylamine added and allowed to polymerize. After the polymerization had reacted to a satisfactory viscosity, the reaction mixture was acidified with glacial acetic acid, washed free of water-soluble materials and the polymer precipitated from solution by pouring the viscous dope into several volumes of methyl alcohol.

The yield of white fibrous block copolycarbonate was 93 percent of the theoretical value and it had an inherent viscosity of 0.68 in chloroform.

A clear film cast from a methylene chloride solution of this block copolycarbonate had the following physical properties:

| | | |
|---|---|---|
| Young's modulus | kg./cm.$^2$ | $2.87 \times 10^4$ |
| Yield and tensile | kg./cm.$^2$ | 670 |
| Elongation | percent | 3 |
| Tear | | 53 |
| Folds | | 13 |
| Heat distortion temperature | °C | 175 |

EXAMPLE J.—BLOCK COPOLYCARBONATE FROM 4,4'-BIS(HYDROXY - 3 - METHYLPHENYL)METHYL - p - CHLOROPHENYL METHANE (50 MOLE PERCENT) AND 4,4' - BIS(HYDROXY PHENYL) - p - ISOPROPYL PHENYL METHANE (50 MOLE PERCENT)

Using the procedure of Example A, the following materials were employed to prepare the prepolymers.

Component A:
- 15.9 g. (0.05 mole) 4,4'-bis(hydroxyphenyl)-p-isopropylphenyl methane
- 5.6 g. (0.14 mole) sodium hydroxide
- 5.4 g. (0.055 mole) phosgene in 50 ml. dry, cold, distilled methylene chloride
- 100 ml. distilled water
- 100 ml. distilled methylene chloride Component B:
- 17.6 g. (0.05 mole) 4,4'-bis(hydroxy-3-methylphenyl) methyl-p-chlorophenyl methane
- 5.6 g. (0.14 mole) sodium hydroxide
- 5.4 g. (0.055 mole) phosgene in 50 ml. dry, cold, distilled methylene chloride
- 200 ml. distilled water
- 100 ml. distilled methylene chloride Component C: 1 ml. tri-n-butylamine The above components (A) and (B) were run separately and simultaneously, combined, the tri-n-butylamine added and allowed to polymerize. After the polymerization had reacted to a satisfactory viscosity, the reaction mixture was acidified with glacial acetic acid, washed free of water-soluble materials and the polymer precipitated from solution by pouring the viscous dope into several volumes of methyl alcohol.

The yield of white fibrous copolycarbonate was 91 percent of the theoretical value and it had an inherent viscosity of 0.75 in chloroform.

A clear film cast from methylene chloride solution of this block copolycarbonate had the following physical properties:

| | |
|---|---|
| Young's modulus _____ kg./cm.$^2$ | $2.44 \times 10^4$ |
| Yield and tensile _____ kg./cm.$^2$ | 658 |
| Elongation _____ percent | 3.5 |
| Tear | 14 |
| Folds | 20 |
| Heat distortion temperature _____ °C | 172 |

Other random copolymers and other block copolymers were prepared following the techniques described above using variations in the prescribed conditions and materials so as to obtain the data such as set forth in the following table. This data shows the value of various properties of solvent cast polycarbonate and comparative films approximately 0.005 inch thick. The values for the comparative films of cellulose triacetate and polystyrene are included in the table since their relationship to the improvement covered by this invention has been discussed hereinabove.

The preparation of film from these various polycarbonate polymers was generally accomplished using methylene chloride as the solvent in proportions such as 4 parts of solvent to 1 part of polymer or other suitable proportions to contain a dope. The data was generally prepared by the machine coating technique employing a conventional coating machine having a dope hopper from which the dope is flowed onto a highly polished coating wheel from which it is stripped and cured as it passes through drying chambers. Of course, hand coating techniques can also be employed using apparatus wherein a coating knife with a vertically adjustable blade is used to manually spread the dope on a glass plate; the plate is put in an oven and dried for an extended period of time such as 18 hours at about 70° F. Although methylene chloride was generally employed, other solvents can also be used (e.g. other halogenated hydrocarbons) for the preparation of a solution or dope of the polymer so that it can be solvent cast or coated as described. Although the films tested in the table were not necessarily exactly 5 mils thick, the data set forth was adjusted accordingly so as to be properly comparable.

In this table the polycarbonates are considered as derived from bisphenols which are coded according to the following definition list:

Bisphenol:

| | Code |
|---|---|
| 2,2-bis(4-hydroxyphenyl) propane | BPA |
| 2,2 - bis(3,5 - dichloro - 4 - hydroxyphenyl) propane | TCBPA |
| 4,4' - bis(hydroxyphenyl)phenylmethane | PM |
| 4,4'-bis(hydroxyphenyl)napthylmethane | NM |
| 4,4' - bis(hydroxyphenyl) - 4 - isopropylphenylmethane | 4IPM |
| 4,4' - bis(hydroxy - 3 - methylphenyl) - 4 - chlorophenylmethane | M4CPM |
| 4,4' - bis(hydroxyphenyl) - 2-chlorophenylmethane | 2CPM |
| 4,4' - bis(hydroxyphenyl) - 2-fluorophenylmethane | 2FPM |
| 4,4' - bis(hydroxyphenyl) - 2,4 - dichlorophenylmethane | 24CPM |
| 4,4 - bis(hydroxyphenyl) - methyl - 3,4 - dichlorophenylmethane | M34PM |

Properties of Solvent Cast Polycarbonate Other and Comparative Films Approximately 0.005 Inch Thick

| | Mole Percent—See Definition List | | | | | | | | | Young's Modulus ($10^4$ kg./cm.) | | Flexibility (MIT Folds) | | Heat Softening or Distortion Temperature (°C.) | |
|---|---|---|---|---|---|---|---|---|---|---|---|---|---|---|---|
| | BPA | TC BPA | PM | NM | 4I PM | 2F PM | 2C PM | 24C PM | M34 CPM | Random | Block | Random | Block | Random | Block |
| (a) | 100 | | | | | | | | | | | | | | |
| (b) | | | | | | | | | | | | | | | |
| (c) | 80 | 20 | | | | | | | | 2.3 | | 148 | | 157 | |
| (d) | 75 | 25 | | 100 | | | | | | 2.1 | | 23 | | 189 | |
| (e) | 70 | 30 | | | | | | | | 2.3 | | 62 | | 154 | |
| (f)[2] | 40 | | | | | | | | | | 2.5 | | 85 | | 165 |
| (g)[2] | 40 | | | 60 | | | | | | 2.3 | | 47 | | 150 | |
| (h) | 37 | | | | | | | | | | [3]2.7 | | [3]52 | | [3]216 |
| (i) | 30 | 70 | | | | 60 | | | | | [2]2.7 | | [2]56 | | [2]177 |
| (j)[3] | | | | | | 63 | | | | 2.9 | | 13 | | 175 | |
| (k)[1] | 25 | 75 | | 25 | | | | | | 2.9 | | 10 | | 172 | |
| (l) | | 75 | | | | | | 75 | | | 3.2 | 20 | | | 223 |
| (m) | 20 | 80 | | 25 | | | | | | | [1]3.0 | [1]70 | | [1]220-240 | |
| (n) | | | | | | | | | | | 3.2 | 35 | | | 242 |
| (o) | | 100 | 100 | | | | | | | 2.9 | | 13 | | 200 | |
| (p)[2] | | | | | | | | | | 3.1 | | 10 | | 204 | |
| (q) | | | | | 100 | | | | | 3.0 | | 16 | | 220-240 | |
| (r)[3] | | | | | | | | | | [2]2.9 | | [2]65 | | [2]225 | |
| (s) | | | | | | | 100 | | 100 | 2.8 | | 15 | | 187 | |
| (t)[2] | | | | | | | | | | [3]2.73 | | [3]80 | | [3]215 | |
| Polystyrene (oriented) | | | | | | | | | 100 | 3.7 | | 10 | | 193 | |
| Cellulose Triacetate | | | | | | | | | | [2]2.55 | | [2]55 | | [2]193 | |
| | | | | | | | | | | 3.5 | | 50 | | 100 | |
| | | | | | | | | | | 3.0–4.0 | | 25–35 | | 155 | |

[1] Covered by Laakso and Buckley Ser. No. 815,273.
[2] Covered by Laakso, Petropoulos and Buckley Ser. No. 827,695.
[3] Covered by Laakso and Buckley Ser. No. 827,705.

The film supports for photographic purposes contemplated by this invention can be coated with black and white or color types of photographic emulsions so as to form a photographic element having unusually valuable properties. The coating of film bases with photographic emulsions is well known in the art and is described in numerous patents and publications such as in a paper by Trivelli and Smith. The Photographic Journal, vol. 79, pages 330–338, 1939. Emulsions such as those described by Trivelli et al. can be readily coated upon the surface of the film base encompassed by this invention using standard coating techniques.

Photographic elements were prepared by coating such an emulsion as described by Trivelli and Smith upon the film base described in the preferred examples.

In a container with temperature control was put a solution with the following composition:

(A)

| | | |
|---|---|---|
| Potassium bromide | gm | 165 |
| Potassium iodide | gm | 5 |
| Gelatin | gm | 65 |
| Water | cc | 1700 |

And in another container was put a filtered solution consisting of:

(B)

| | | |
|---|---|---|
| Silver nitrate | gm | 200 |
| Water | cc | 2000 |

Solution A was kept at a temperature of 70° C. during precipitation and ripening, while solution B was put in a separating funnel at a temperature of 72° C. The silver nitrate solution ran from the separating funnel through a calibrated nozzle into the container, the contents of which were kept in constant motion during precipitation and ripening, and, later, during finishing, by a mechanical stirrer.

After the precipitation, the emulsions were ripened for 20 minutes at the temperature of precipitation (70° C.). Then, they were cooled as quickly as possible to 45° C., and at this temperature 250 gm. of washed gelatin were added to each emulsion. The emulsions were stirred for 20 minutes at 45° C. in order to dissolve this gelatin. After standing overnight in a cold storage room, the emulsions were shredded and washed. They were then melted in the container at a temperature of 42° C. The weight of each of the emulsions was brought to 6.3 kg. (14 lbs.) by adding 100 gm. of gelatin soaked in the required amount of distilled water. Finishing was accomplished in 30 minutes, at a temperature of 60° C.

The photographic elements prepared as described were exposed to light and tested to determine their characteristics and found to behave satisfactorily in all regards and to have exceptionally advantageous properties at temperatures in excess of 150° C., a quite satisfactorily high degree of flexibility, and a Young's modulus of elasticity adequate for normal photographic purposes, especially when a suitable pelloid was applied to the back of the support. If desired the silver halide emulsion can be coated upon a subbing which is first applied to the film support and may be composed of a suitable gelatin composition or a terpolymer latex as described in the prior art, e.g. a latex of an acrylic ester, a vinyl or vinylidene halide and an unsaturated acid such as acrylic acid or itaconic acid, cf. U.S. 2,570,478. See also British Patent 808,629.

In the data presented herein the flexibility test was performed on a well cured film having a minimal retention of solvent since solvent retention in recently made film may give unrealistic values as to flexibility. The MIT folds test was performed using an MIT folding endurance tester made by Tinius Olsen; the technique employed is that originally designed some years ago for testing the flexibility of paper and now generally recognized as applicable to sheets of synthetic resins, viz. ASTM Method D643–43.

The block copolyesters as described are also useful as sheet packaging materials, adhesive tape bases, kinescope recording tape, dielectrics for condensers, etc. They have high melting points and are tough, elastic, tear resistant, resilient and are endowed with good electrical properties under various conditions including moist humid air in the tropics, air frictional heat in the nose cones of rockets or missiles, carbon arc motion picture projection, etc.

Although the invention has been described in considerable detail with reference to certain preferred embodiments thereof, it will be understood that variations and modifications can be effected without departing from the spirit and scope of the invention as described hereinabove and as defined in the appended claims.

As mentioned above other applications by Laakso and Buckley cover:

(1) Block copolycarbonates from bisphenol A and 4,4'-bis(hydroxyphenyl)naphthyl methanes, and the homopolymers of 4,4'-bis(hydroxyphenyl)naphthyl methanes, wherein the naphthyl radicals may contain halogen atoms, Ser No. 827,705.

(2) Block copolycarbonates of bisphenol A and 4,4'-bis-(hydroxyphenyl)-monohalophenyl methanes and homopolymers of the latter bisphenol, Ser. No. 827,695.

(3) Block copolycarbonates of bisphenol A and 4,4'-bis-(hydroxyphenyl)-methyldihalophenyl methanes, Ser. No. 827,694.

We claim:
1. An improved polycarbonate of 2,2-bis(3,5-dichloro-4-hydroxyphenyl)propane consisting of a highly polymeric block copolymer having an inherent viscosity of from about 0.5 to about 3.5 essentially composed of alternating blocks having the structures:

I. Blocks characterized in that these blocks as an independent polymer would have an inherent viscosity of at least 0.05 measured in chloroform and be composed of from about 3 to about 50 recurring units having the following Formula A:

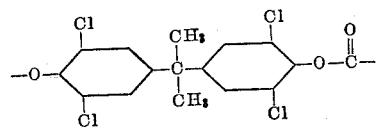

and

II. Blocks characterized in that these blocks as an independent polymer would have an inherent viscosity of at least 0.05 measured in chloroform and be composed of about 3 to about 50 recurring units having the following Formula B:

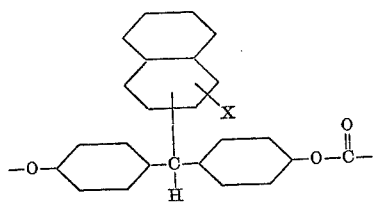

wherein the naphthyl radical is attached in a position selected from the 1 and 2 positions and X represents the substituent in the other one of the 1 and 2 positions and is selected from the group consisting of a chlorine atom, a fluorine atom and a hydrogen atom and wherein from about 40 to 85 mole percent of said block copolymer is composed of said units having Formula A, said block copolymer being characterized by having a heat distortion temperature in the range of from about 190°–250° C., having a Young's modulus of elasticity for film which is substantially as great as for the homopolymer of units of Formula A and at least about 30,000 kg./sq. cm. which is greater than for the homopolymer of units of Formula B, and having a flexibility measured by the MIT folds test at least about 2 times greater than for the homopolymer of units of Formula A and at least about 35.

2. An improved film of a polycarbonate as described in claim 1 wherein the mole percent of said block copolymer composed of said units having Formula B is 25%, said block copolymer being particularly characterized by having a heat distortion temperature of about 242° C., having a Young's modulus of elasticity of about 32,000 kg./sq. cm. and having a flexibility measured by the MIT folds test on the order of about 35.

References Cited in the file of this patent

UNITED STATES PATENTS

| | | |
|---|---|---|
| 2,698,241 | Saner | Dec. 28, 1954 |
| 2,799,666 | Caldwell | July 16, 1957 |
| 2,843,567 | Williams et al. | July 15, 1958 |
| 2,874,046 | Klockgether et al. | Feb. 17, 1959 |
| 2,970,131 | Moyer | Jan. 31, 1961 |

FOREIGN PATENTS

| | | |
|---|---|---|
| 578,585 | Canada | June 30, 1959 |

OTHER REFERENCES

Schnell: Ind. Eng. Chem., 51, 157–160 (February 1959).